US008843769B2

(12) United States Patent
Kimelman

(10) Patent No.: US 8,843,769 B2
(45) Date of Patent: Sep. 23, 2014

(54) MICROCONTROLLER WITH EMBEDDED SECURE FEATURE

(75) Inventor: Paul Kimelman, Alamo, CA (US)

(73) Assignee: Texas Instruments Incorporated, Dallas, TX (US)

(*) Notice: Subject to any disclaimer, the term of this patent is extended or adjusted under 35 U.S.C. 154(b) by 115 days.

(21) Appl. No.: 13/439,530

(22) Filed: Apr. 4, 2012

(65) Prior Publication Data

US 2012/0265975 A1 Oct. 18, 2012

Related U.S. Application Data

(60) Provisional application No. 61/476,680, filed on Apr. 18, 2011.

(51) Int. Cl.
| | | |
|---|---|---|
| *G06F 12/14* | (2006.01) | |
| *H04L 9/32* | (2006.01) | |
| *H04L 29/06* | (2006.01) | |
| *G06F 21/57* | (2013.01) | |
| *G06F 21/53* | (2013.01) | |
| *G06F 21/76* | (2013.01) | |

(52) U.S. Cl.
CPC ............... *G06F 21/57* (2013.01); *G06F 21/76* (2013.01); *G06F 21/53* (2013.01); *G06F 2221/2105* (2013.01)
USPC ............... 713/194; 713/1; 713/162; 713/168; 713/193

(58) Field of Classification Search
None
See application file for complete search history.

(56) References Cited

U.S. PATENT DOCUMENTS

| 2001/0052070 A1* | 12/2001 | Oishi et al. ............. 713/151 |
| 2004/0123118 A1* | 6/2004 | Dahan et al. ............. 713/189 |
| 2012/0036347 A1* | 2/2012 | Swanson et al. ............. 713/2 |

OTHER PUBLICATIONS

"Intel Platform Innovation Framework for EFI System Management Mode Core Interface Specification (SMM CIS)", Draft for Review, Intel Corporation, Version 0.9, Sep. 16, 2003, pp. 1-151.
Robert R. Collins, "Intel's System Management Mode", pp. 1-5, Jan. 1997, available at http://www.rcollins.org/ddj/Jan97/Jan97.html.
"ARM Security Technology, Building a Secure System using TrustZone Technology", PRD29-GENC-009492C, ARM Limited, Apr. 2009 (First Release Dec. 2008), pp. 1-108.

* cited by examiner

*Primary Examiner* — Fatoumata Traore
(74) *Attorney, Agent, or Firm* — John R. Pessetto; Frederick J. Telecky, Jr.

(57) ABSTRACT

A secure environment is established within a system on a chip (SoC) without the use of a memory management unit. A set of security parameters is produced by a configuration program executed by a processor within the SoC that is read from a first non-volatile memory within the SoC. A set of stored parameters is created in a committable non-volatile memory within the SoC by writing the set of security parameters into the committable non-volatile memory. The committable non-volatile memory is sealed so that that it cannot be read or written by the processor after being sealed. The stored parameters can then be accessed only by control circuitry. Security circuitry within the SoC is configured using the stored parameters each time the SoC is initialized and thereby enforces the secure environment within the SoC.

10 Claims, 3 Drawing Sheets

MICROCONTROLLER WITH EMBEDDED SECURE FEATURE

CLAIM OF PRIORITY UNDER 35 U.S.C. 119(e)

The present application claims priority to and incorporates by reference U.S. Provisional Application No. 61/476,680, filed Apr. 18, 2011, entitled "Security Hypervisor."

FIELD OF THE INVENTION

This invention generally relates to providing a secure environment on a microcontroller, and in particular, to the use of embedded non-volatile memory to provide a secure environment.

BACKGROUND OF THE INVENTION

Hypervisors are mechanisms running above the operating or supervisory control of the system. The term may be applied to software, but the traditional model is a hardware virtualization. In modern application processors, Hypervisors are used to create virtual environments to run different guest operating systems. In servers, this may be to have more than one instance of the same operating system to allow more than one 'session' on the network. In desktop systems, this may be to have different operating systems running to allow users to use applications from different operating systems. In embedded systems like phones, this may be to have a real-time operating system and an application operating system. In each case of application processors, there is assumed to be an MMU (Memory Management Unit) which plays a part in this virtualization.

A hypervisor requires a secure environment for its execution so that a guest program is not allowed to accidentally or maliciously gain control of the underlying hardware system and resources. In many systems, a secure environment may be provided by a memory management unit (MMU) that includes permission controls for various blocks of system memory and other resources.

The term virtualization really means that each operating system believes it has sole control of the processor and system, although it likely sees a subset of the real system. The virtualization usually includes a dividing of the real physical memory, a dividing or virtualization of the peripherals of the system (whether a peripheral shows up only in one such virtual environment or is shared such that each thinks it has sole control) as well as a dividing of time. The virtualization of peripherals is needed to allow sharing of communications such as networks. Whether this is done in hardware or in software depends on the system. In most systems, access to shared resources simply 'traps' into hypervisor software which can see everything.

For security and other related uses, a more limited hypervisor model has been used. For example, TrustZone in ARMv6 and later processors and SMM (system management mode) in Intel x86 processors. ARM (advanced RISC machine) processors are licensed to various vendors by ARM Ltd. In these systems, there are mechanisms to trap into these special operating systems, dividing the system into two environments. For TrustZone, it is a more traditional virtual environment, but with many limitations and restrictions. For SMM, there is no virtualization at all.

In general, the use of security protection in deeply embedded systems has existed for a while but traditionally has been limited to a supervisor vs. user modal and/or an MPU (memory protection unit). Neither mechanism provides true isolation or separation and certainly not any kind of virtualized environment. The most common historical technique for safety and security has been to use two separate processors (a security processor and a normal processor), where each has its own environment and resources. In many cases, the security processor can see all of the resources of the normal processor, but not the reverse. This partial virtualization has also been used in non-embedded systems, especially as it is needed to allow sharing of resources such as network and maybe screen.

BRIEF DESCRIPTION OF THE DRAWINGS

Particular embodiments in accordance with the invention will now be described, by way of example only, and with reference to the accompanying drawings.

Figure 1:
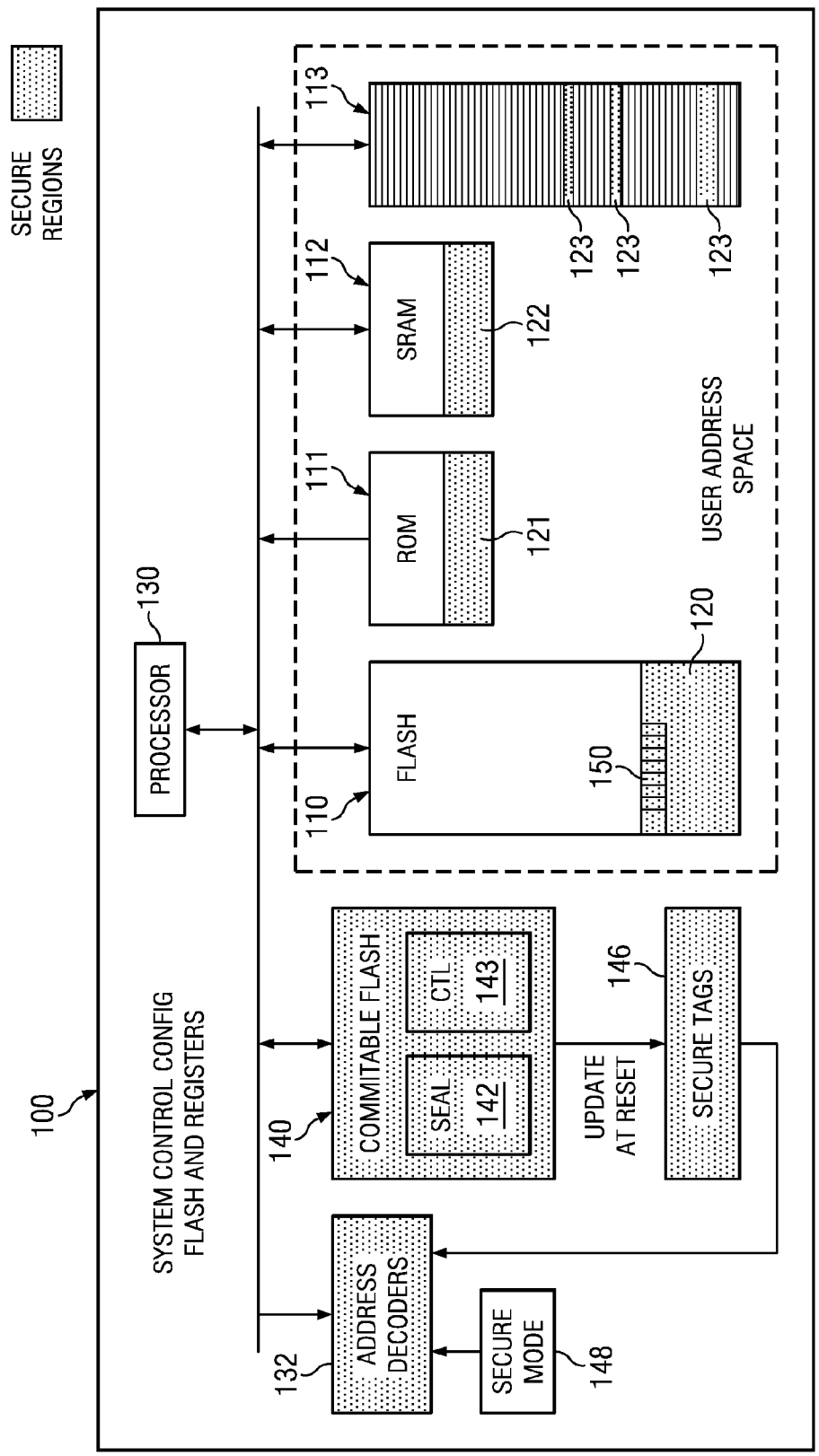
FIG. 1 illustrates various secure regions within a secure environment of a system on a chip (SoC)

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In deeply embedded systems, the processors do not generally include an MMU (memory management unit). Some may include an MPU (memory protection unit), but an MPU typically does not provide support for a virtualized environment. The need for a Hypervisor in the deeply embedded systems is generally for security reasons. In that case, the most useful model is to split into two virtual environments, where each may be running its own application components. Deeply embedded systems may use a real-time operating system (RTOS) or no operating system at all. Embodiments of the invention may provide a secure environment to support a Hypervisor in the deeply embedded processor space without the need for an MMUs and virtual memory.

In an embodiment of the invention implemented in a SoC, a secure environment may be established by an initialization process, as will be described in more detail below. During the initialization process, a set of security parameters may be produced by a configuration program executed by a processor within the SoC by accessing a non-volatile memory within the SoC. A set of stored parameters may be created in an embedded non-volatile memory within the SoC by writing the set of security parameters into the embedded non-volatile memory by the configuration program. The embedded non-volatile memory may then be sealed by the configuration program such that the hidden non-volatile memory cannot be read or written by the processor after being sealed. However, the stored parameters may still be accessed only by hardware control circuitry coupled to the embedded non-volatile memory. Security circuitry within the SoC is then configured using the stored parameters each time the SoC is reset. The security circuitry enforces the secure environment within the SoC.

A lightweight security Hypervisor scheme may be implemented in the resulting secure region. The lightweight security Hypervisor scheme may be used to provide strong security and isolation of a software application and its associated data in a low cost embedded system, for example. In some embodiments, a security Hypervisor may be used to create exactly two virtual environments to allow separation of trusted/secure code from un-trusted/insecure in a microcontroller based system, for example. The definition of trusted/secure is up to the creator of the system. The definition of un-trusted/insecure is only the code that is not trusted/secure—that is, there is no implication of (lack of) quality or intent.

The level of separation may be strong enough to prevent leakage of intellectual property (IP) associated with program code and/or data that is stored in the secure regions through both direct and indirect means. Direct means include accessing memory or peripherals from the un-trusted/insecure code, as well as access of memory via debug ports or other test modes. Indirect means may be any covert/side channel, such as using a timer ISR or debug single step, to look at registers.

The hypervisor may be designed to allow the exact size of ROM, Flash, and RAM to be configured when the secure image is installed, for example, at a secure "programming" manufacturing flow. Additionally, secure peripherals that are only visible to secure code and other rules may likewise be set up when the secure image is installed. Once set up, these cannot be changed. This allows the programmed parts to then be shipped to developers of the insecure code or into an insecure manufacturing process.

Various embodiment of the invention may include hardware that is designed to support one or more specific use models, such as: sandbox, secure services, and pure isolation.

The sandbox use model may be configured to allow secure code to take control from Reset (power-on and system reset) and allows insecure code to run in a controlled way. A full sandbox model may run the insecure code in a User mode that is enforced by an MPU to control the exact "sandbox" which the insecure code is allowed to use. The insecure code may be allowed to access secure services from the secure code as needed. Typically the user code runs as tasks in an RTOS (real time operating system) type environment.

The secure services use model may be configured to allow the insecure code to be the primary application and to allow the insecure code to may make calls to secure functions (services) to have functions performed for insecure code. The secure code may be secured simply to protect IP (algorithms, etc), to control access to a specific peripheral or set of peripherals, or because it performs cryptographic or other secured operations. For example, encrypted messages may flow across a network and be fed to the secure code to allow the secure code to handle the messages in a private way.

The pure isolation use mode may be configured to allow secure and insecure applications to run in parallel to each other and have no contact. For example, in personal computing environments, a trusted platform module (TPM) is often implemented using a separate microcontroller that stores keys, passwords and digital certificates for encryption applications. Note that even with pure isolation, the secure code may perform hashes on the insecure code at Reset to verify its goodness and it may perform the over-air-updates of both images as needed.

In each use model, the choice about how trusted the insecure code is may affect specific use decisions. For example, in many cases the secure code may provide no protection against denial-of-service; as long as it fails safe and allows no leakage due to failure. However, in this case, the insecure code may still hamper operation of the secure code, such as by preventing interrupts from reaching the secure code. Such a failure would not leak anything, but would simply mean lack of the functionality provided by the secure code.

Basic Outline of a Secure Hypervisor Model

A basic secure hypervisor system has two modes: secure mode and normal (insecure) mode. Secure mode is only possible when fetching code from a secure zone and the secure code has enabled the secure mode.

In some embodiments, the secure mode may be enabled only by passing one of a few entry gates into the secure "zone". The secure zone is a range of locations that the program counter may be in. The secure mode is disabled by exiting the secure zone, intentionally or not.

In other embodiments that may include two or more processing cores, one of the processing cores may be configured to execute only secure code, therefore that processing core may always be in secure mode.

While in secure mode, the program counter (PC) is fetching instructions from secure Flash (electrically erasable memory) or ROM (read only memory). Peripherals marked as secure are accessible and RAM marked as secure is accessible.

Debug/trace is held off from action while in secure mode, but may be allowed again once out of the secure zone. This modal approach means that the insecure application may be debugged normally, but that no information is leaked while in the secure zone. Note that "held off from action" includes counters, watch-point matches, Flash Patch/break triggers, etc When not in secure mode, secure Flash, ROM, RAM, and secure peripherals are unavailable for any kind of access, such as by a processor, DMA (direct memory access), debug, etc. Such accesses will result in a bus fault. The only exception is fetch from the entry gates in Flash or ROM.

Writes to secure mode flash memory are allowed only while in secure mode and may be prohibited after an initialization procedure if so configured, as will be described in more detail later.

Interrupt support may be designed to allow a range of capabilities, depending on what is needed for a particular application. For example, the secure code may configure a forced catch of Reset, NMI, and/or Hard Fault interrupts; either all of the time, or only while in secure mode. The secure code may configure interrupts to be directed to a secure disambiguation entry point. The system may be configured to cause all interrupts to go through a secure disambiguation entry point if the unsecure code moves the vector table to SRAM. In cases where the unsecure code is not trusted, the sandbox use model may be appropriate.

Entry Gates

For an embodiment in which there is only one processor core, an entry gate may be used to control access to the secure environment. This is a set of entry locations at a known address of the non-volatile memory that holds the secure code. Each gate is a word and contains a branch instruction to a target address within the secure region of the non-volatile memory. The number of gates may be selected to match the needs of a particular system or application. For example, an embodiment may allow between eight and 1024 such words; the exact number may be defined when the system is initialized.

Code may enter from normal (insecure) areas to any of the entry locations, some by interrupt and some by call. The branch instruction at the selected gate will be executed and jump to the target address specified by the branch instruction. At the target address, the secure code may check details of the call by executing a vetting routine at the target address that verifies the jump instruction was executed by a legitimate access program. If not valid, the secure code may simply force a safe exit or fault. It is important to note that entry through a gate means only that the code is in the secure zone, the secure vetting code then needs to activate the secure mode in order to use the full secure capabilities, including protected RAM and peripherals.

On enabling the secure mode, a number of capabilities are available to the system. On exit from the secure zone for any reason, intentional or not, the capabilities are instantly disabled and the system ensures a full data barrier is enforced in such a manner that correct system operation may continue.

Secure Zone Model

The secure zone is defined as a range of Flash and ROM. The secure zone may be the end of the Flash and ROM, for example. Of course, an embodiment may locate the secure zone in another area of Flash and/or ROM by providing appropriate address decoding hardware. The Flash may be defined as a multiple of 8K bytes, such as the last 56K, for example. The secure ROM may be pre-defined for the given part.

Secure code may only execute from the secure zone. Secure code may not execute from RAM, but secure code may read and write both secure and normal RAM, ROM, and Flash. Secure RAM can only be accessed when in secure mode.

Additionally, peripherals may be marked as secure and so can only be accessed when in secure mode.

Each of these memory controls are stored permanently in the committable secure configuration registers and cannot be undone after an initialization process, which will be described in more detail below in the secure registers section.

Typically, networking peripherals like Ethernet, USB (universal serial bus), and CAN (controller area network) would not be secure. Instead, the secure code and the insecure code would use separate "channels" within the network, such as: endpoints, ports, etc. The secure code would naturally encrypt messages on such open communication systems to prevent leakage. In some cases, such as point to point USB, the peripheral may be secure instead.

However, even if the system allowed reservation of one endpoint, it could be tampered with and snooped easily, at least from outside the SoC device. It is up to the secure system to determine if a message has been hijacked or altered, whether internally or externally.

FIG. 1 illustrates various secure regions within a secure environment of SoC 100. Flash memory 110, ROM 111, and SRAM 112 may have secure regions 120, 121, 122 that may vary on size depending on how the system is initialized and committed. Peripherals 113 are representative of any of a number of peripheral devices that may be located in the address space of SoC 100. Peripherals 113 may provide communications, control functions, sensing functions, etc. for SoC 100. One or more of peripherals 113 may be designated as secure peripherals 123 during the initialization and commitment process. Flash memory 110 is an EEPROM (electrically erasable programmable read only memory) in this embodiment. Other embodiments may use other types of non-volatile memory to hold secure program code.

Flash 110 has a secure zone 120 at the end of the flash that is implemented as a multiple of 8K, such as 16K, 32K, 88K in order to simplify logic within address decoders 132. ROM 111 may include a secure portion 121 as defined for the specific SoC device that may contain controls for secure boot to validate a program image before allowing control to be passed to it.

Processor 130 executes instructions that may be accessed from Flash 110, ROM 111 and SRAM 112. Similarly, processor 130 may read and write data to peripherals 113 using memory mapped load and store instruction. Address decoders 132 receive instruction fetch addresses and data access addresses from processor 130 and enable access to the requested storage location. Address decoders 132 may be configured during the initialization and commitment process to enforce the various secure regions 120-123.

Embedded flash memory 140 is implemented in such a manner that it can written to by processor 130 until it is sealed, or committed. It may be sealed by writing a particular data value into a particular address 142, for example. Seal control logic 143 monitors the seal address to determine if the commitment value has been written. Initially, when SoC 100 is manufactured, seal location 142 will have a default value, typically all ones, for example. Processor 130 may execute an initialization program that is placed in Flash 110 or ROM 111 to produce a set of security parameters that are written into flash memory 140. Processor 130 then writes the seal value to seal location 142. Once control logic 143 detects that the seal value has been written into seal location 142, it then inhibits any further read or write accesses to flash 140 by setting a non-volatile control bit within flash 140.

Secure tags 146 is a set of register bits or flip-flops that may be loaded with the parameter data values taken from flash 140 each time SoC is turned on and comes out of reset. Flash memory 140 may be implemented as a small block of storage using CMOS (complimentary metal on silicon) EEPROM technology, for example. In some embodiments, flash memory 140 may have only a few hundred or so bits of storage. Flash memory 140 may therefore be implemented in such a manner that the data stored therein can be transferred to secure tags 146 under control of a hardware logic each time SoC is turned on and comes out of reset.

This commitment operation on flash 140 that prevents software access to the security parameters but which allows continuing hardware based access to the stored set of security parameters to allow secure registers 146 to be configured each time SoC is reset allows for a robust secure environment to be provided within SoC 100. The manufacturer of SoC 100, or a third party that has purchased SoC 100 for use in a larger system, may install an initialization program in flash memory 110, ROM 111 or SRAM 122 that can be executed once to produce the set of security parameters and then seal them in flash 140. The security parameters may include data value to control the operation of address decoders 132 and thereby establish secure regions 120-123. The security parameters may also include a private key and a public key for an encryption process. Using known encryption techniques, secure communication may then be established between SoC 100 and a remote system via a non-secure communication peripheral included within set of peripherals 113.

A hardware random number generator is an apparatus that generates random numbers from a physical process. Such devices are often based on microscopic phenomena that generate a low-level, statistically random "noise" signal, such as thermal noise or the photoelectric effect or other quantum phenomena. These processes are, in theory, completely unpredictable, and the theory's assertions of unpredictability are subject to experimental test. A hardware random number generator may be included in embodiments of SoC 100 that includes a transducer to convert an aspect of the physical phenomena, such as thermal noise, to an electrical signal, an amplifier and other electronic circuitry to increase the amplitude of the random fluctuations to a macroscopic level, and an analog to digital converter to convert the output into a digital number, often a simple binary digit 0 or 1. By repeatedly sampling the randomly varying signal, a series of random numbers is obtained. This random number may then be stored in flash 140. At each reset event, it will be transferred to secure tags 146 to be used as the private encryption key. Once flash 140 is sealed, the private key will be undetectable by conventional means.

Secure tags 146 and flash 140 are embedded within the interior of SoC 100 and provide no visibility to outside agents. Secure registers 146 and flash 140 may be coupled to a scan chain for manufacturing test purposes, but after the initialization and commitment process, they may be permanently disconnected from the scan chain. In other embodiments, they initialization process may set secure parameters that prevent the secure registers from being included in a diagnostic chain unless enabled by secure code.

Since secure tags 146 and flash memory 140 are implemented within the sea of gates and mesh of interconnect traces that embody SoC 100, it would be very difficult for a malicious agent to monitor the operation of these circuits by probing SoC 100 using a physical probe. Therefore, once the execution program produces the set of security parameters, stores them in flash 140 and then seals flash 140, a robust secure environment is created within SoC 100 that does not rely on a memory management unit.

While FIG. 1 illustrates an SoC with a single processor 130, other embodiments may include two or more processors. In such an embodiment, the secure environment may be restricted to just one of the processors, for example. The other processor(s) may then be configured to operate insecure code only.

Figure 2A:
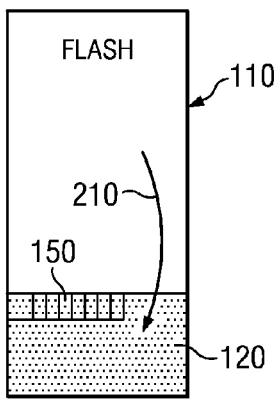
FIGS. 2A-2C illustrate operation of a secure environment using an entry gate.
Figure 2B:
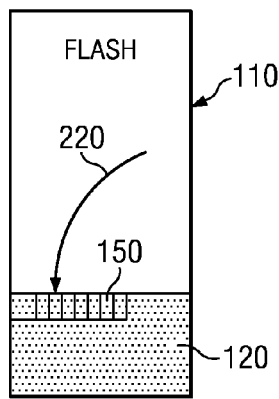
Figure 2C:
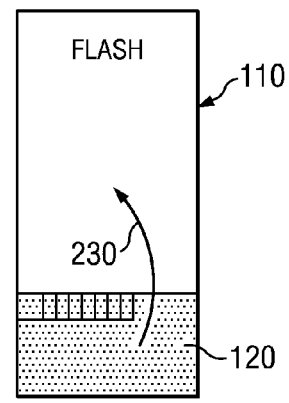

FIGS. 2A-2C illustrate operation of a secure environment using entry gate 150 in non-volatile memory 110. Entry gate 150 provides a mechanism for establishing a secure mode of operation that may be useful in a single processor SoC embodiment, for example. In a multiple processor embodiment, one of the processors may be designated to provide the secure environment and may therefore always operate in secure mode. Therefore, in such a multiprocessor embodiment, secure gate 150 may not be needed and therefore not implemented. However, in other multiprocessor embodiments, it may be useful to allow a processor that is providing a secure environment to also occasionally execute insecure code. In such a multiprocessor embodiment, use of an entry gate may be useful for enabling secure mode operation.

Entry gates 150 are N words, where N may be a power of two such as 8, 16, 32, or 1024, for example, to simplify hardware decoding. Of course, an embodiment may include more complex hardware decoding and N may therefore be any selected value supported in such an embodiment. Each word of entry gates 150 is a branch instruction to validation code that is located within secure region 120. There may be a small number of entries which then use an argument, such as an operand, to determine the action requested for a particular one of entry gates 150. Or, there may be many entries for each action. For example, there may be a Send( ) and Receive( ) call from an insecure user. This could be one entry called IO_Operations( ) which is passed an argument to indicate whether SEND or RECEIVE, or it could be two entries.

An Example Secure Gate Setup

The secure zone gates are branches elsewhere into the secure zone. Table 1 illustrates an example set of entry gates in which five are valid and the last three branch to a location that indicates a fault. At each valid entry, a branch instruction causes program execution to branch to validation code that performs a vetting operation to verify the entry gate branch instruction was executed by a legitimate access program.

TABLE 1 example set of entry gates

:secure_zone_start:
    b    validate_secure_init
    b    validate_isr_secure_timer6
    b    validate_isr_uart3
    b    validate_request_translate
    b    validate_gen_entry
    b    invalid
    b    invalid
    b    invalid For example, Table 2 illustrates a vetting routine for a general entry gate, such as the fifth entry gate of Table 1. In Table 2, LR refers to a link register within processor 130 that holds the return address of the last CALL instruction that that requested entry to the secure region. The SP register is the stack pointer for processor 130 for passing parameters, and the ISR_stack[PC] contains a return address for an interrupt. Various checks are performed by the validation code to attempt to verify that the insecure caller is legitimate.

TABLE 2 vetting routine for a general entry gate

```
int validate_gen_entry(SEC_REQ eRequest, SEC_GENDATA
*xpGenData)
{
 if (SecureGeneralValidate(true, eRequest, xpGenData) == −1)
    return(−1);   // invalid request
 SysCtl.EnableSecure = 1;   // we now allow secure mode
 switch (eRequest)
 {
   ... // handle request
 }
}
int SecureGeneralValidate(tBoolean bNotISR, SEC_REQ eRequest,
SEC_GENDATA *xpGenData)
{
 // Validate for all function entries
 if ((____LR_register >= SECURE_START
       &&  ____LR_register <= SECURE_END)
     || (bNotISR && ____LR_register >= 0xFFFFFFF0)
     || (!bNotISR && ____LR_register < 0xFFFFFFF0))
 { // attempt to trick it by returning into itself or, invalid entry type
       ____LR_register = 0x20000000-4; // fault
    return(−1);
 }
 if (____SP_register >= SECURE_RAM_START
   && ____SP_register <= SECURE_RAM_END)
   return(−1);   // trying to trash our stack
 // note above should check for max stack need as well
 if (bNotISR)
 {
   if (eRequest >= SECREQ_LAST) return(−1); // invalid
   if (!CheckPointers(xpGenData)) return(−1);// bad pointers
   // Is OK for basic use
   // checking for pointers into secure space directly or by being too long.
 }
 else
 {
   if (____ISR_stack[PC] >= SECURE_RAM_START
```

TABLE 2-continued vetting routine for a general entry gate

```
  && ____ISR_stack[PC] <= SECURE_RAM_END)
{ // trying to trick on return from ISR
    ____LR_register = 0x20000000-4; // fault
  return(-1);
}
// no arguments
}
}
```

It is important to note that the code illustrated in Table 2 does not actually enable secure mode until all validation checks have passed successfully. This provides some extra protection against Trojan horses and other malicious attacks. The argument validation process first checks for such attacks (including data pointers into secure code or data space, etc) before enabling the mode.

FIG. 2A illustrates an attempt 210 to branch directly into secure region 120 without going through an entry gate 150. In this case, address decoder 132 monitors each instruction fetch address and initiates a bus error if a data read or write request is made to an address within secure region 121, 122, 123 when secure mode tag 148 is not asserted. Secure mode tag 148 may be implemented as a standalone flip-flop, a bit in a multi-bit register, etc., and may include additional logic to implement a secure mode state machine, which will be described n more detail with regard to FIG. 3.

FIG. 2B illustrates a valid call 220 from an insecure region of flash 110 to secure region 120 via entry gate 150. In this case, address decoder 132 monitors the instruction fetch address and allows access to the branch instruction in the entry gate location, even though secure mode tag 148 is not yet asserted. Secure zone code may run without bus error, but it cannot access secure mode data and peripherals. In other words, it can branch anywhere or run any code in the secure zone but that code is limited until secure mode has been enabled. Since code within the secure zone is by definition secured code, there no direct risk by code execution within the secure zone. The security scheme provides protection against an indirect risk, such as Trojan horse. So, if the caller passes in a pointer to a secure mode area and the vetting code tries to read or write it, security hardware within decoders 132 will detect the read or write attempt by code within the secure zone and it will cause a fault to provide a protection barrier. Once the vetting code is satisfied, it can enable secure mode and then reading and writing will be allowed.

FIG. 2C illustrates exiting 230 secure region 120 via call, return, or jump. As soon as address decoder 132 detects an instruction fetch address or a data access (read or write) outside of secure region 120, it causes secure tag 148 to be de-asserted. Thus, any further access within secure region 120 will be prohibited by address decoder 132.

Figure 3:
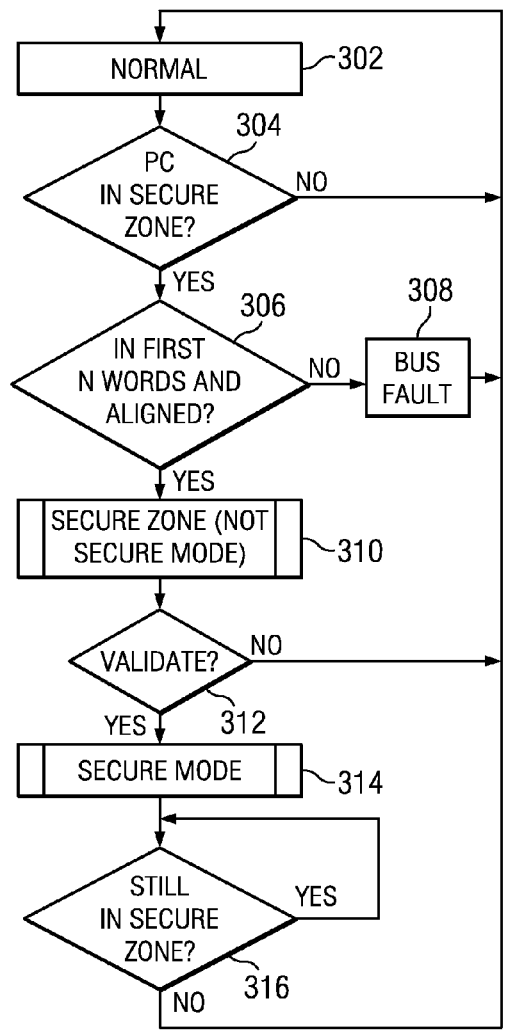
FIG. 3 is a flow diagram illustrating operation of a secure mode state machine.

FIG. 3 is a flow diagram illustrating operation of a secure mode state machine that operates in response to address decoder 132 and secure mode tag 148. Entry from normal mode 302 is initiated by detecting 304 a program counter address within the secure region address space. Entry to the secure region is only allowed 306 when a PC address is within the first N words of the secure zone of flash and word aligned. These N words comprise the entry gates, as described in more detail above. Attempts to fetch to any other location will cause a bus fault 308.

Once in secure zone 310, the validate code may run 310. Once the validate code decides the entry is valid 312, as described in more detail above, it may enable 314 secure mode. The validate code also ensures that the store buffer is drained, which prevents a delayed from occurring within the secure region.

As long as program execution then remains 316 with the secure region, secure mode will remain enable. As soon as any access occurs 316 outside of the secure region, secure mode is terminated.

Figure 4:
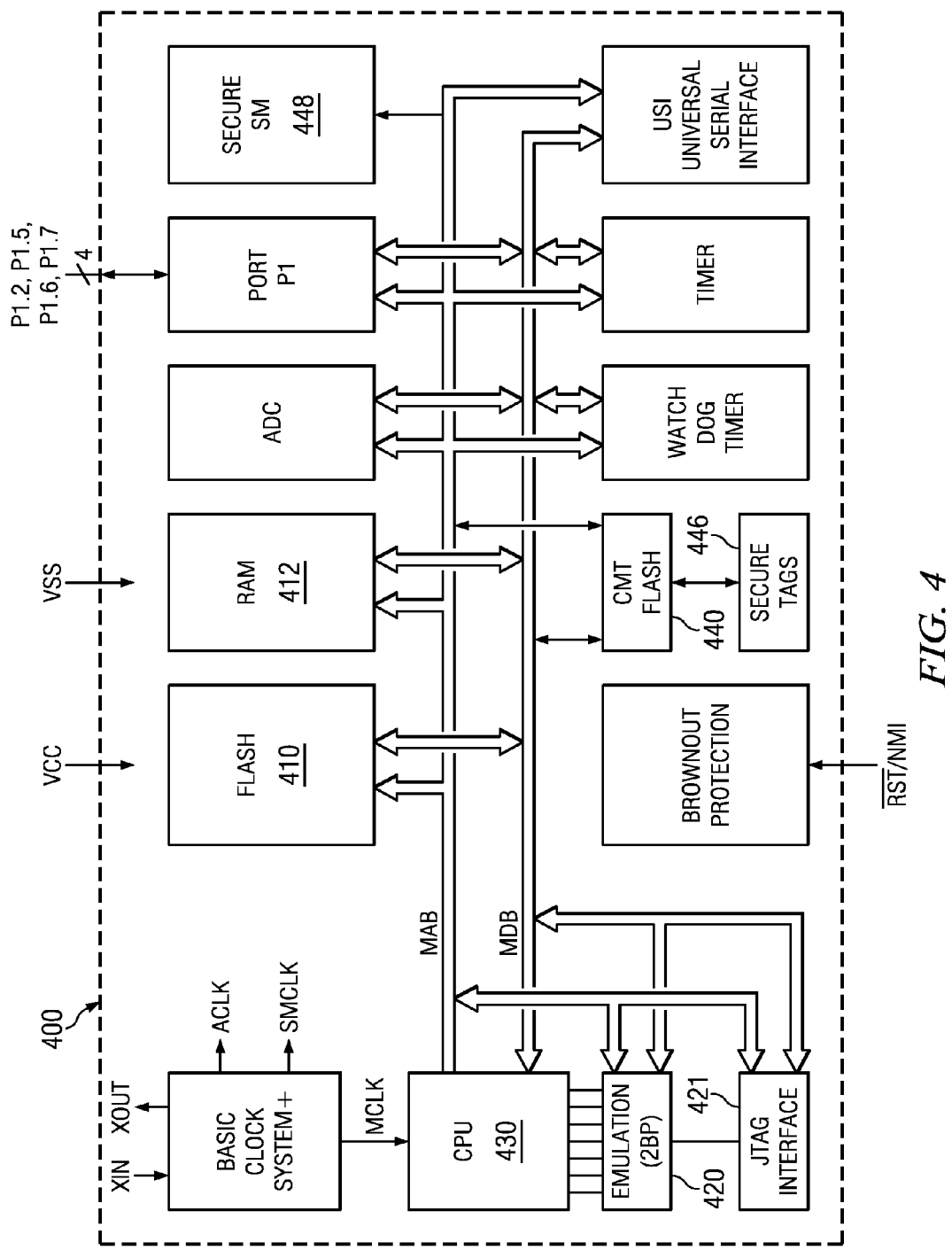
FIG. 4 is a block diagram of an SoC that provides a secure environment.

FIG. 4 is a block diagram of SoC 400 that is another embodiment of an SoC that provides a secure environment. Processor 430 is coupled to flash memory 410 and random access memory 412 via address bus MAB and data bus MDB. Various peripherals may also coupled to the address and data bus. As described in more detail above, a secure execution environment may be established by executing an initialization program that produces a set of security parameters and storing them in committable flash memory 440. The initialization program may then seal flash memory 440 by writing a particular data pattern which then renders committable flash 440 un-accessible by software. Thereafter, each time SoC 400 is reset, security circuitry with SoC 400 is configured by transferring the stored security parameters from flash 440 to secure tag hardware 446 under hardware control with no access from software or external exposure. Secure tag hardware 446 enforces security features in cooperation with secure state machine 448 as described in more detail above, such as preventing data reads or writes to areas of memory that are specified to be secure areas unless a secure mode is enabled.

As discussed previously, debug and emulation ports 420, 421 are disabled from operation under control of the secure state machine 448 hardware whenever execution is being performed within a secure region of memory 410, 412.

Figure 5:
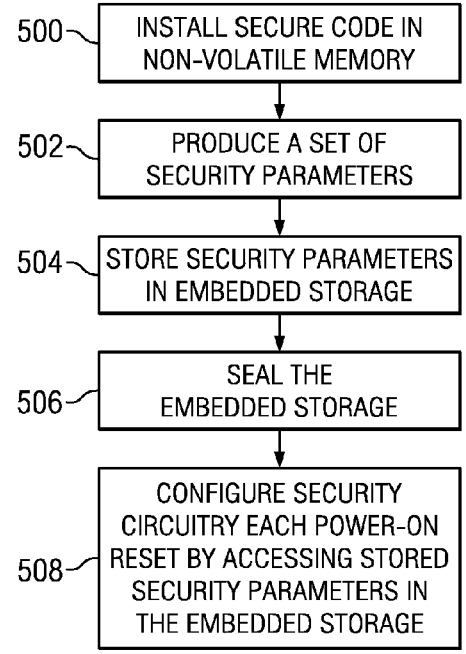
FIG. 5 illustrates use of embedded storage to create a secure execution environment.

FIG. 5 illustrates use of embedded storage to create a secure execution environment within a system on a chip. Secure instruction code is installed 500 in non-volatile memory of the SoC. One or more entry gates may also be established by storing a branch instruction to a target address at a known address in the non-volatile memory. Validation routines may also be installed in the non-volatile memory.

A set of security parameters is produced 502 by a configuration program executed by a processor within the SoC. A portion of the stored parameters may be produced by a random number generator to form a private encryption key for use in encoding or decoding messages sent or received by the SoC by using the private encryption key, for example. The configuration program is read from a first non-volatile memory within the SoC after manufacture of the SoC by either the manufacturer or by a third party.

A set of stored parameters is created 504 in a committable non-volatile memory within the SoC by writing the set of security parameters into the committable non-volatile memory by the configuration program.

The committable non-volatile memory is then sealed 506 by the configuration program such that the committable non-volatile memory cannot be read or written by the processor after being sealed. The stored parameters can then be accessed only by control circuitry coupled to the committable non-volatile memory. The committable non-volatile memory may be sealed by writing a specific data pattern to a defined location within the committable non-volatile memory.

Security circuitry within the SoC is configured 508 using the stored parameters each time the SoC is initialized, such as each time the SoC is powered on. The security circuitry enforces the secure environment within the SoC.

While in the secure Zone, the program counter is restricted to fetching from the secure ROM or Flash. While in the secure zone, the secure code may enable secure mode and unlock peripherals and SRAM. This can be overridden by committable flash such that secure mode is implied by secure zone.

Other Embodiments

While the invention has been described with reference to illustrative embodiments, this description is not intended to be construed in a limiting sense. Various other embodiments of the invention will be apparent to persons skilled in the art upon reference to this description. For example, an SoC may contain one processor in which entry gates are used to enforce the secure mode. In another embodiment, the SoC may contain multiple processors in which the secure environment is exclusive to one of the processors and entry gates are not needed to enforce the secure environment. In either embodiment, an embedded committable non-volatile memory is used to configure the secure environment.

While a single chip system SoC was described herein, other devices and components may be coupled to a chip containing one or more processors, non-volatile memory and security hardware to produce a multiple chip system with a secure execution environment enforced within the SoC as described herein.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for establishing a secure environment within a system on a chip (SoC), the method comprising:
    producing a set of security parameters by a configuration program executed by a processor within the SoC, wherein the configuration program is read from a first non-volatile memory within the SoC;
    creating a set of stored parameters in a second non-volatile memory within the SoC by writing the set of security parameters into the second non-volatile memory by the configuration program;
    sealing the second non-volatile memory by the configuration program such that the second non-volatile memory cannot be read or written by the processor after being sealed, such that the stored parameters can then be accessed only by control circuitry coupled to the second non-volatile memory;
    configuring security circuitry within the SoC using the stored parameters each time the SoC is initialized, wherein the security circuitry enforces the secure environment within the SoC;
    establishing one or more entry gates by storing a branch instruction to a target address at a known address in the first non-volatile memory prior to sealing the second non-volatile memory; and
    establishing a secure region within the first non-volatile memory by the security circuitry, wherein the secure region can only be accessed by first executing the branch instruction at the known address to the target address within the secure region by an access program.

2. The method of claim 1, wherein a portion of the stored parameters form a private encryption key, further comprising encoding or decoding messages sent or received by the SoC by using the private encryption key.

3. The method of claim 1, wherein the second non-volatile memory is sealed by writing a specific data pattern into the second non-volatile memory by the configuration program.

4. The method of claim 1, wherein establishing the secure region further comprises executing a vetting routine at the target address that verifies the branch instruction was executed by a legitimate access program.

5. The method of claim 4, wherein establishing the secure region further comprises suspending access to the secure region by the access program immediately upon any access outside the secure region.

6. A system on a chip (SoC), comprising:
    a processor coupled to a non-volatile memory by an address bus;
    address decoding logic coupled to the address bus;
    an embedded non-volatile memory configured to be sealed by an instruction executed by the processor; and
    security logic coupled to receive security parameters from the embedded non-volatile memory under hardware control after the embedded non-volatile memory is sealed, wherein the security logic is configured to enforce a secure execution environment within the SoC in response to the security parameters, wherein a configuration program installed in the non-volatile memory, when executed by the processor, is configured to:
    produce a set of security parameters;
    create a set of stored parameters in the embedded non-volatile memory by writing the set of security parameters into the embedded non-volatile memory;

seal the embedded non-volatile memory such that the embedded non-volatile memory cannot be read or written by the processor after being sealed, such that the stored parameters can then be accessed only by hardware control circuitry coupled to the embedded non-volatile memory and used to configure the security circuitry using the stored parameters each time the SoC completes a power-on reset;

wherein the non-volatile memory contains one or more entry gates comprising a branch instruction to a target address stored at a known address; and wherein a secure region within the non-volatile memory is established by the security circuitry, wherein the secure region can only be accessed by first executing the branch instruction at the known address to the target address within the secure region by an access program.

7. The SoC of claim 6, wherein a portion of the stored parameters form a private encryption key for use in encoding or decoding messages sent or received by the SoC.

8. The SoC of claim 6, wherein the second non-volatile memory is sealed by writing a specific data pattern into the second non-volatile memory by the configuration program.

9. The SoC of claim 6, wherein establishing the secure region further comprises executing a vetting routine at the target address that verifies the branch instruction was executed by a legitimate access program.

10. The SoC of claim 9, wherein the security logic is configured to suspend access to the secure region by the access program immediately upon any access outside the secure region.

* * * * *